United States Patent

Wagstaff et al.

[11] Patent Number: 5,444,969
[45] Date of Patent: Aug. 29, 1995

[54] ROUND BALER APPARATUS FOR MONITORING BALE SHAPE

[75] Inventors: Robert A. Wagstaff, Lancaster; John B. Crego, New Holland, both of Pa.

[73] Assignee: New Holland North America, Inc., New Holland, Pa.

[21] Appl. No.: 89,545

[22] Filed: Jul. 12, 1993

[51] Int. Cl.⁶ .................................... A01F 15/07
[52] U.S. Cl. ........................ 56/341; 56/10.2 R; 100/88
[58] Field of Search .......... 56/341, 10.2, 16.4; 100/88, 89

[56] References Cited

U.S. PATENT DOCUMENTS

| | | | |
|---|---|---|---|
| 4,224,867 | 9/1980 | Gaeddert et al. | 100/88 |
| 4,517,795 | 5/1985 | Meiers | 56/341 |
| 4,686,820 | 8/1987 | Andra et al. | 56/341 |
| 4,698,955 | 10/1987 | Wagstaff | 56/341 |
| 4,748,801 | 6/1988 | Sheehan et al. | 56/341 |
| 4,870,812 | 10/1989 | Jennings et al. | 56/341 |
| 5,123,338 | 6/1992 | Mathis | 56/341 X |
| 5,131,214 | 7/1992 | Vermeer | 56/102 |

Primary Examiner—Terry Lee Melius
Attorney, Agent, or Firm—Frank A. Seemar; Larry W. Miller

[57] ABSTRACT

A round baler having a main frame, a tailgate pivotally connected to the main frame and an apron extending around a plurality of guide rolls disposed in the main frame and the tailgate. A pair of take up arms, rotatably mounted on the main frame, carry at least one additional guide roll for the apron. A bale forming chamber, including the apron, varies in size from a bale starting position to a full bale position. A crop loading monitor is provided for signaling the operator when the compactness of the crop material in at least one portion of the bale being formed in the bale forming chamber reaches a predetermined acceptable level.

12 Claims, 5 Drawing Sheets

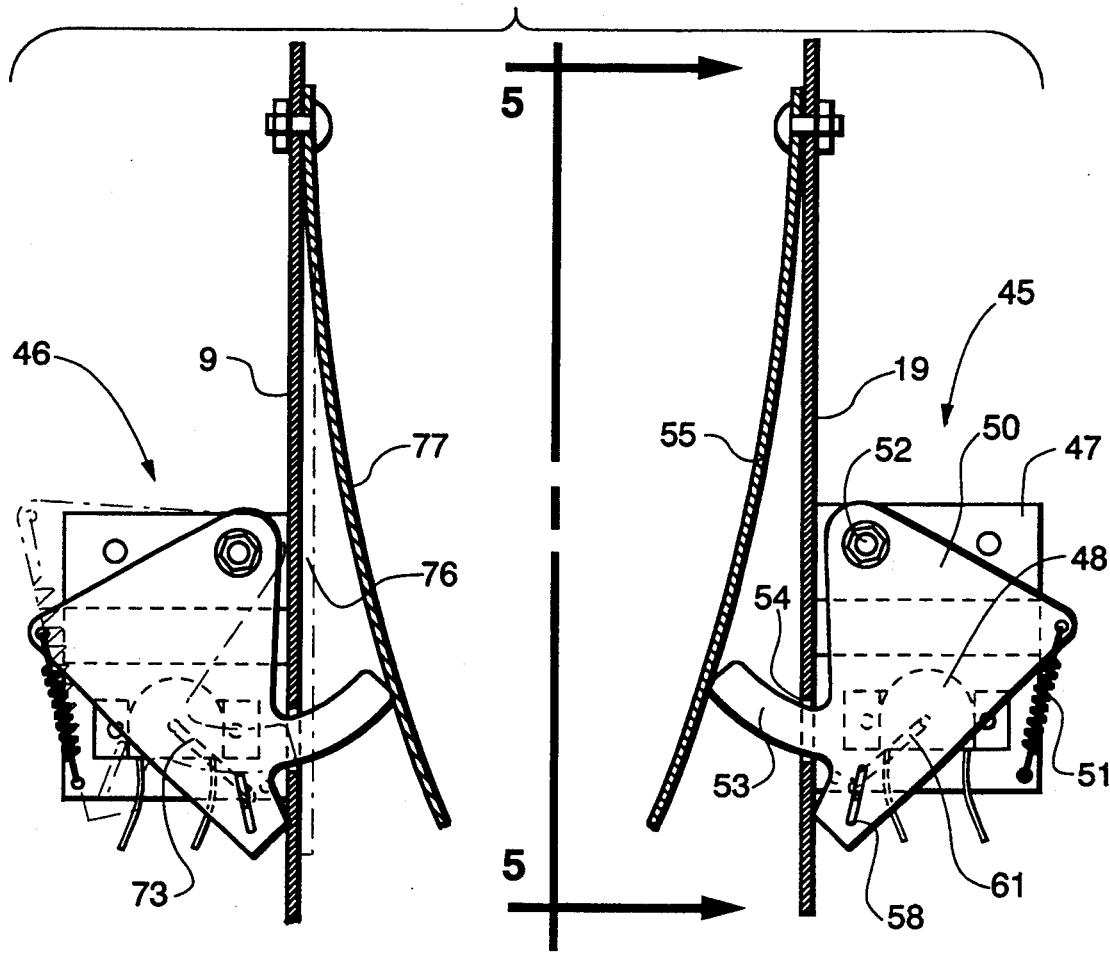
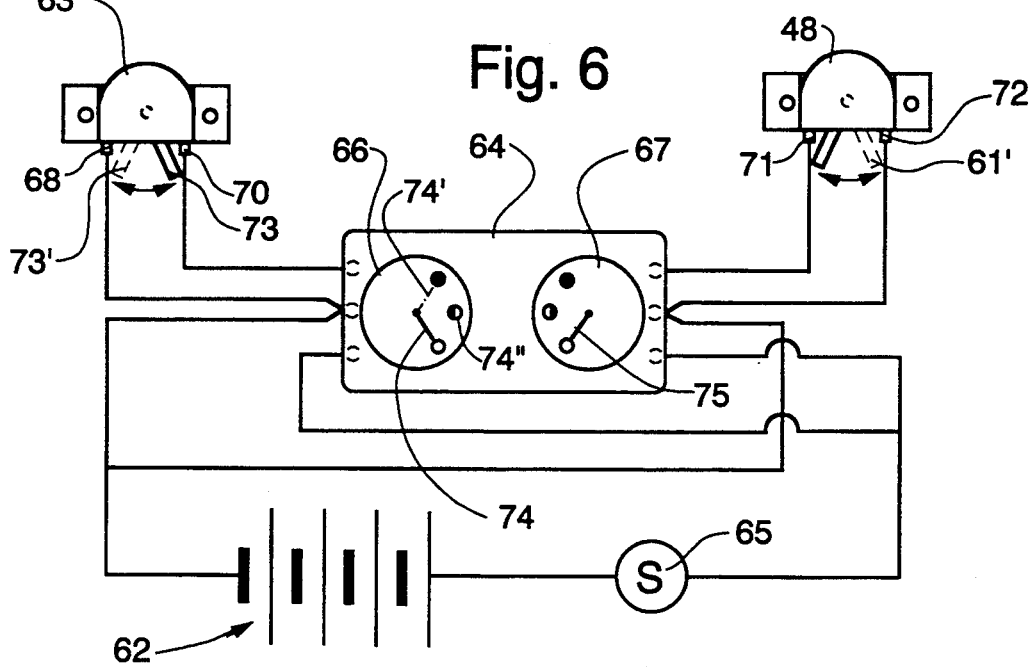

ROUND BALER APPARATUS FOR MONITORING BALE SHAPE

FIELD OF THE INVENTION

The present invention relates generally to round balers and more particularly to apparatus for monitoring the degree of compaction of crop material in the chamber in which the bale is being formed.

BACKGROUND OF THE INVENTION

Round balers generally have a bale forming chamber defined by a pair of opposing side walls associated with an array of side-by-side belts, transverse slats trained on chains, a plurality of rolls or a combination of these various elements, e.g., rolls and belts. During field operation, windrowed crop material such as hay is picked up from the ground and fed into a fixed or variable diameter chamber. The hay is then rolled into a cylindrical package, wrapped with twine, net or the like and ejected onto the ground for subsequent handling.

Because it is not uncommon for windrows of crop material to be uneven and typically narrower than the width of the bale forming chamber, it is necessary for the operator of some prior art balers to observe the shape of the bale being formed and weave the baler in a generally zigzag pattern to uniformly distribute hay across the bale being formed and thereby avoid poorly shaped bales. This approach relies on the experience of the operator to determine when to laterally shift the position of the baler. The lack of exactness, inability to observe the bale shape, reliance on operator skill and operator fatigue all contribute to the possibility of improper feeding causing misshaped bales.

In belt type balers where a substantially uniform diameter is not maintained, improper tracking occurs resulting in belt jamming and damage. In addition, the uneven shape of the bale causes low density areas on the bale periphery which could result in premature deterioration of the bale during field storage, where it is exposed to weather extremes, i.e., the low density area does not shed water as well as an evenly balanced and uniformly compacted area.

Many present day balers of the various types mentioned above recognize the need for enhancing bale shape. Systems are employed that address the problem of conveniently and consistently forming bales having a substantially uniform diameter throughout their length. This has been accomplished to a certain degree by utilizing monitoring arrangements to ascertain parameters that in turn are used in the control of functions that have a direct bearing on the shape of bales formed. A bale shape controlling system of this type is disclosed in U.S. Pat. No. 4,748,801, issued Jun. 7, 1988, 1979 in the name of Ronald T. Sheehan, et al. This system includes first and second indicator lights, and bale diameter monitoring apparatus for alternately generating signals in the lights in response to predetermined incremental expansion of the bale forming chamber. This enables the operator to position the baler to feed crop to one side of the bale forming chamber when a signal is generated in one indicator and to position the baler to feed crop to the other side of the chamber when a signal is generated in the other indicator.

In U.S. Pat. Nos. 4,224,867, issued Sep. 30, 1980 in the name of Melvin V. Gaeddert, et al, and 4,517,795, issued May 21, 1985 in the name of Gerald F. Meiers, similar prior art systems are shown in which a monitor senses belt tension at both sides of the bale being formed in the chamber and generates signals to the operator directly related to the relative diameters. This enables the operator to steer the baler in a manner that will feed crop material to the area in the chamber that is deficient in an attempt to prevent the bale from becoming improperly shaped.

In another system, disclosed in U.S. Pat. No. 4,686,820, issued Aug. 18, 1987, in the name of Bryan K. Andra, et al, tension on the belts is utilized to generate a signal that is used to control apparatus that varies the path of crop being fed to the bale forming chamber. The baler is driven straight down the windrow, hay is picked up and as it is being conveyed toward the chamber the stream of hay is deflected into one of three regions of the chamber based on diameter differentials.

In yet another prior art system, disclosed in U.S. Pat. No. 5,131,214, issued Jul. 21, 1992, in the name of Gary J. Vermeer, a crop loading monitor is employed to assist the operator in the formation of round bales. The monitor in this instance comprises an interval timer which signals the operator to direct crop material to alternate sides of the baler at preselected time intervals.

The existing round baler monitoring systems described above either monitor the general baler diameter, various relative diameters or the time interval during which crop is being fed.

SUMMARY OF THE INVENTION

An important object of the present invention is to provide a novel monitoring system for the bale forming chamber of a round baler that improves uniformity of shape and thereby enhances overall baler performance.

In pursuance of this and other important objects the present invention provides in a round baler having a crop pickup for feeding crop material or the like to a bale forming chamber, a crop loading monitor comprising signal means, and apparatus operably coupled with the signal means for indicating when the compactness of a bale being formed in the bale forming chamber changes. More specifically, it is contemplated that the apparatus includes a pair of sensors for simultaneously measuring the relative compactness of the bale at first and second portions thereof.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE DRAWINGS

FIG. 4 is a view taken in the direction of arrows 4—4 in FIG. 1.

FIG. 6 is a schematic diagram of the electrical circuit in which the sensors of the present invention are connected.

DESCRIPTION OF THE PREFERRED EMBODIMENT

Figure 1:
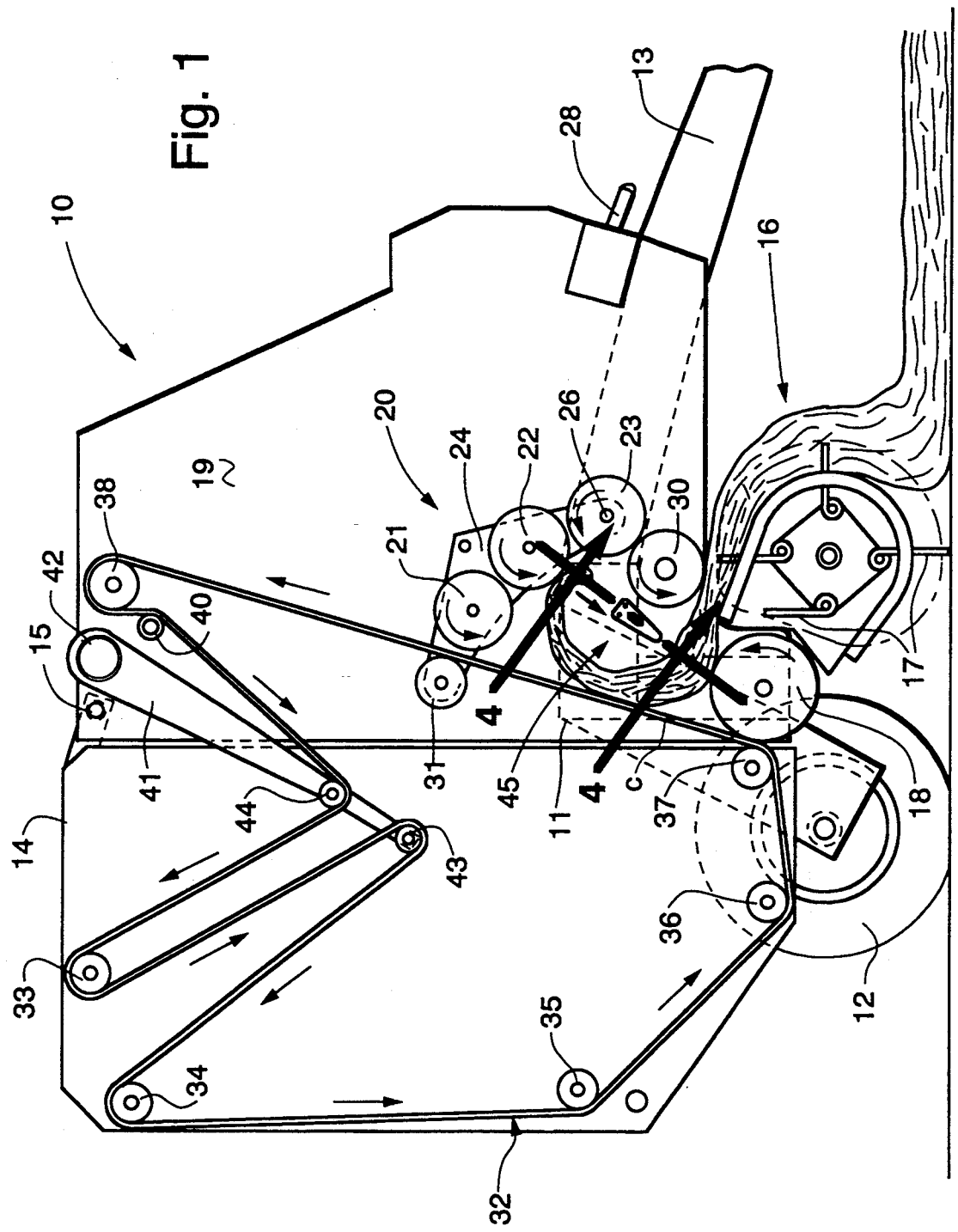
FIG. 1 is a diagrammatic side elevational view of a round baler in which the present invention is embodied.

Referring to the drawings for a detailed description of the preferred embodiment of the invention, FIG. 1 shows a round baler 10 of the type having an expandable chamber defined in part by belts and rollers, as disclosed in U.S. Pat. No. 4,870,812, issued Oct. 12, 1989 in the name of Richard E. Jennings, et al, in which the preferred embodiment of the present invention is readily incorporated. Baler 10 has a main frame 11, including a pair of side walls, supported by a pair of wheels 12 (only one shown). A forwardly mounted tongue 13 is provided on main frame 11 for connection to a tractor. Pivotally connected to a side wall 19 by a pair of stub shafts 15 is a tailgate 14 which is closed during bale formation. A pickup 16, mounted on main frame 11, includes a plurality of tines 17 movable in a predetermined path to lift crop material from the ground and deliver it rearwardly toward a floor roll 18, rotatably mounted on main frame 11.

A chamber for forming bales is defined partly by a sledge assembly 20 comprising a plurality of transversely extending rollers 21, 22, 23 journalled at their ends in a pair of spaced apart arms 24, one of which is shown. These arms are pivotally mounted on stub shafts 26 for providing movement of sledge assembly 20 from the bale starting position shown in FIG. 1 through the partly full position shown in FIG. 2 to the full bale position shown in FIG. 3. Rollers 21, 22, 23 are driven in a counter-clockwise direction by conventional means (for example, chains and sprockets) coupled to a drive shaft 28. A starter roll 30, located adjacent roller 23, is also driven counter-clockwise. A freely rotatable idler roller 31, carried by arms 24, moves in an arcuate path with sledge assembly 20.

The bale forming chamber is further defined by an apron 32 comprising a plurality of continuous side-by-side belts supported by guide rolls 33, 34, 35, 36, 37 rotatably mounted in tailgate 14. Apron 32 is also supported on a drive roll 38, mounted on main frame 11. Although apron 32 passes between roller 21 and idler roller 31, it is in engagement only with idler roller 31 and not roller 21 which serves to strip crop material from the belts, in addition to its bale forming function. Suitable coupling means (not shown) connected to drive shaft 28 provide rotation of drive roll 38 causing movement of apron 32 along the varying paths in the directions indicated by the arrows in FIGS. 1, 2 and 3. An additional guide roll 40 in the main frame 11 ensures proper driving engagement between apron 32 and drive roll 38. A pair of take up arms 41 (only one shown) are pivotally mounted on main frame 11 by a cross shaft 42 for movement between inner, intermediate and outer positions shown in FIGS. 1, 2 and 3, respectively. Take up arms 41, which carry additional guide rolls 43, 44 for supporting apron 32, are urged toward their inner positions (FIG. 1), by conventional means, e.g., springs.

When the elements of round baler 10 are disposed as shown in FIG. 1, an inner course c of apron 32 extends between guide roll 37 and idler roll 31 to form the rear wall of the core starting chamber while the inwardly facing peripheral surfaces of rollers 21, 22, 23 define in a general manner a rearwardly inclined cooperating front wall. Floor roll 18 defines the bottom of the chamber and with starter roller 30 provides an inlet for crop material.

Figure 2:
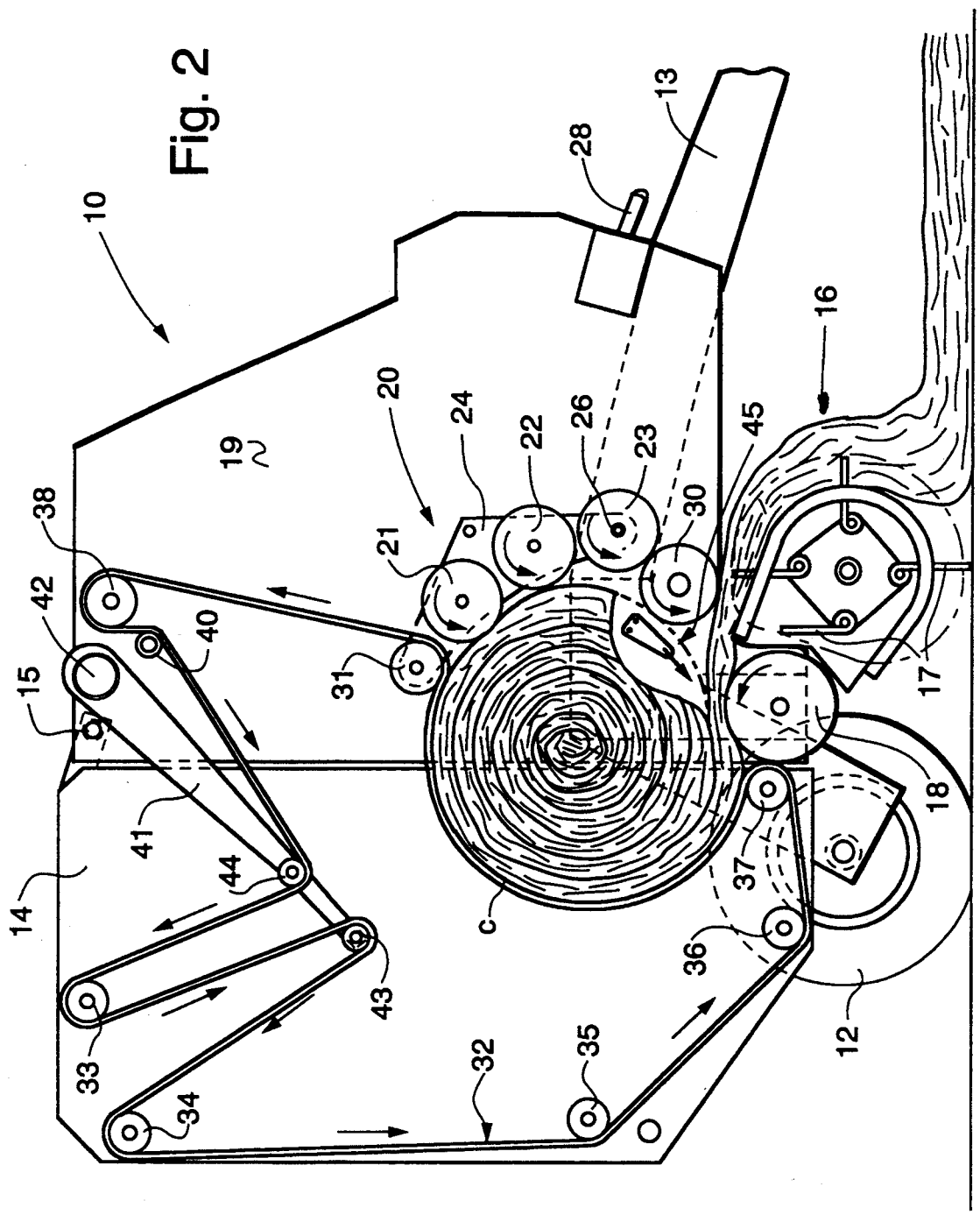
FIG. 2 is similar to FIG. 1 with the bale forming chamber in its partly full position.

When round baler 10 travels across a field, pickup tines 17 lift crop material from the ground and deliver it through the inlet. The crop material is carried rearwardly by floor roll 18 into engagement with apron inner course c (FIG. 1) which urges it upwardly and forwardly into engagement with the rollers on sledge 20. In this manner crop material is coiled in a clockwise direction to start a bale core. Continued feeding of crop material into the bale forming chamber by pickup tines 17 causes the apron inner course c to expand in length around a portion of the circumference of the bale core as the diameter increases (FIG. 2). Take up arms 41 rotate from their inner positions shown in FIG. 1 toward their outer positions shown in FIG. 3 to provide for expansion of the inner course of the apron in a well known manner, i.e., in effect the outer course of the belts of apron 32 is diminished in length while the inner course increases a like amount. After a bale has been formed and wrapped, tailgate 14 is opened and the bale is ejected rearwardly. Subsequent closing of tailgate 14 returns the inner and outer courses of the belts 32 to the locations shown in FIG. 1.

Figure 3:
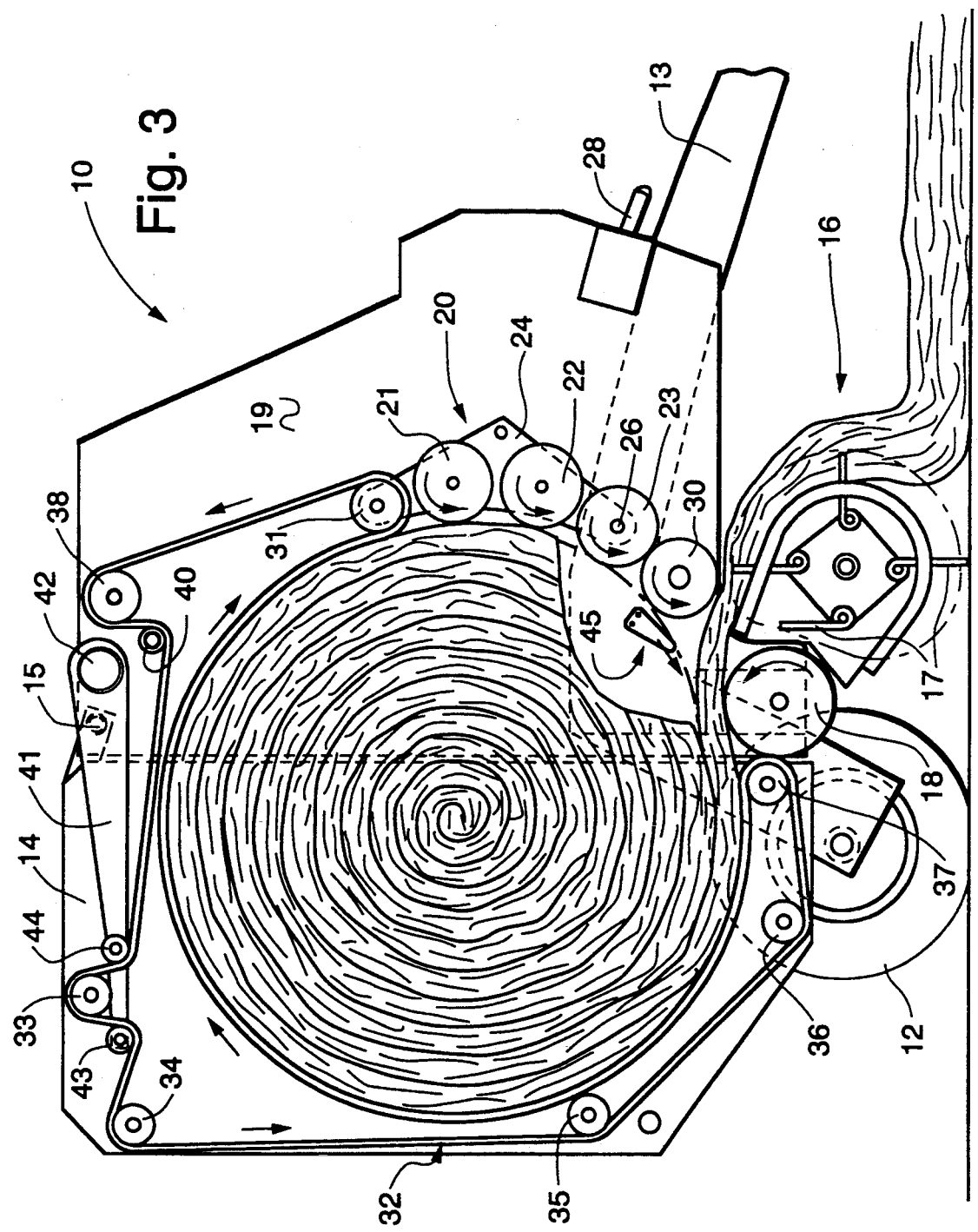
FIG. 3 is also similar to FIG. 1 with the bale forming chamber in its full bale position.

During bale formation, sledge assembly 20 also moves between a bale starting position (FIG. 1) to a full bale position (FIG. 3). This movement of sledge assembly 20 causes idler roller 31 to move in an arcuate path while maintaining apron 32 in close proximity to roller 21, thereby allowing roller 21 to strip crop material from the belts and prevent or reduce significantly the loss of crop material between roller 21 and apron 32 during formation of a bale. Sledge assembly 20 is pushed outwardly towards its full bale position during bale formation as the crop material expands against rollers 21, 22, 23 and then subsequently is pulled inwardly by apron 32 to the position shown in FIG. 1.

With the above description and general operation of baler 10 as a background, attention is directed to a sensor assembly 45 mounted on side wall 19, shown in FIGS. 1-3. FIG. 4 shows a pair of sensor assemblies 45, 46, one of which is mounted on side wall 19, as shown in FIGS. 1-3, and the other of which is similarly mounted on the opposing side wall 9, not shown in FIGS. 1-3. For the purposes of this description, only assembly 45 will be described in detail but it is intended that like comments apply to assembly 46.

Figure 5:
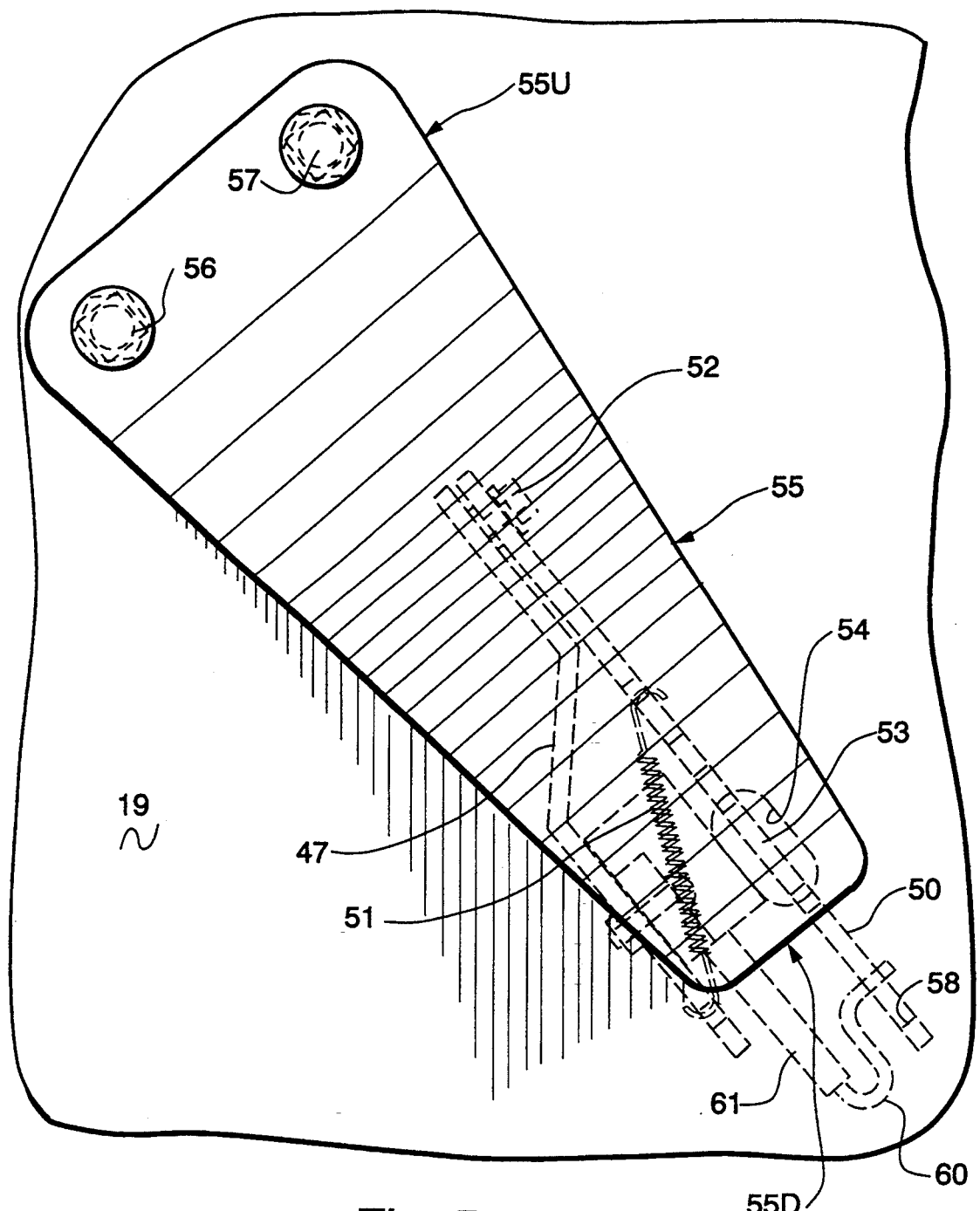
FIG. 5 is a view taken in the direction of arrows 5—5 in FIG. 4.

A bracket 47, affixed to the outside of side wall 19, has mounted thereon a potentiometer 48 and a sensor plate 50. A spring 51 engages plate 50 to urge it in a clockwise direction around a pivot 52, at which pivot plate 50 is mounted to bracket 47. The bias of spring 51 holds plate 50 against wall 19, through which an integral finger portion 53 extends (via aperture 54) against a leaf spring 55 secured to the inside of side wall 19 by conventional means such as bolts 56, 57 (see FIG. 5). Spring 51 is designed to provide force sufficient to maintain leaf spring 55 in the position shown under inoperative conditions, i.e., no crop material in the chamber.

A slot 58, in plate 50 accommodates an actuator rod 60 extending from a control arm 61. When plate 50 swings about pivot 52, rod 60 traverses slot 58 and thereby moves control arm 61 from the solid position (FIG. 6) to the phantom position, designated by 61'.

The schematic diagram in FIG. 6 depicts a voltage source 62 connected to potentiometers 48, 63 and signal means 64 by an on/off switch 65. The positive and negative terminals of battery 62 are connected to signal devices 66, 67 which read the varying potential across terminals 68, 70 and 71, 72 of potentiometers 63, 48. When control arms 61, 73 are in the solid positions, i.e., inoperative condition, the signal devices so indicate via the corresponding solid position of indicator needles 74, 75. Variations in potential across the potentiometer terminals causes a like variation at the signal devices, until maximum travel of the control arm is reached. This is illustrated by the phantom position 76 of leaf spring 77, which corresponds to the phantom position 73' of control arm 73 which in turn corresponds to the resulting phantom position 74' of needle 74 of signal device 66.

In operation, as mentioned above crop material is picked up by pickup 16 and conveyed by tines 17 to floor roll 18 which urges it against upwardly traveling course c of apron 32. When the bale forming chamber is empty (FIG. 1) material begins to spiral in a clockwise direction until it engages the rollers of sledge assembly 20 which continues to roll it in a spiral fashion causing course c to expand through the position shown in FIG. 2 to the full bale position shown in FIG. 3. During this bale forming operation, crop material adjacent the side walls in the outer portion of the bale being formed is in continuous contact with leaf springs 55, 77 of sensor assemblies 45, 46. More specifically, crop material traverses the leaf springs in a longitudinal fashion from the upstream end 55U to the downstream end 55D, using spring 55 as an example. The crop material travels in a generally spiral path and urges leaf springs 77, 55 toward side walls 9, 19, respectively. The position of the control arms will vary based on the position of the leaf springs which will move toward or away from the side walls based on the force exerted by crop material passing thereover. This force is directly proportional to the degree of compactness of the crop material. The leaf springs in turn move the control arms of the potentiometers, thereby varying the potential in direct relationship to the compactness of the crop material being sensed which in turn is indicated by the signal means in the manner described above.

Thus, as the bale increases in diameter the compactness of the sides is monitored enabling the operator to, firstly, ascertain when the crop material has reached the desired level of compactness and, secondly, to modify the relative quantity of crop material being fed to the transverse sectors of the bale forming chamber in response to the relative levels indicated. For example, the predetermined acceptable range is reached when needle 74 is above point 74" on signal device 66. After this level is attained the operator uses the signal means to indicate the degree of compactness on one side relative to the other and the operator will steer the baler accordingly to balance the levels indicated.

While preferred structure incorporating principles of the present invention is shown and described above, it is to be understood that the invention is not limited to such structure, but that, in fact, widely different means of varying scope and configuration may be employed in the practice of the invention.

Having thus described the invention, what is claimed is:

1. In a round baler having an expandable bale forming chamber, a crop loading monitor comprising
   signal means, and
   apparatus operably coupled with said signal means for indicating when the compactness of a generally cylindrical package of crop material in said expandable bale forming chamber changes,
   said apparatus includes one or more sensors for simultaneously independently measuring the compactness of said cylindrical package of crop material at one or more portions thereof under conditions where it is being continuously formed into an expanding generally cylindrical package.

2. In a round baler as set forth in claim 1 wherein
   said expandable bale forming chamber includes a pair of side walls,
   said apparatus includes a pair of sensors for simultaneously independently measuring the compactness of said generally cylindrical package of crop material at first and second portions thereof, and
   said pair of sensors are mounted in opposition, each being associated with one of said side walls.

3. In a round baler as set forth in claim 1 wherein
   said signal means includes one or more signal devices corresponding respectively to one or more portions of said generally cylindrical package of crop material being formed in said bale forming chamber,
   each of said devices being operable independently of the other to indicate the relative compactness of said one or more portions.

4. In a round baler having an expandable bale forming chamber and means for feeding crop material into said chamber to form a generally cylindrical package of crop material, a crop loading monitor comprising
   signal means, and
   apparatus operably coupled with said signal means for indicating when the compactness of said generally cylindrical package of crop material in said expandable bale forming chamber reaches a predetermined acceptable level,
   said apparatus includes sensor means for sensing changes in the compactness of said crop material in said expandable bale forming chamber under conditions where it is being continuously formed into an expanded generally cylindrical package.

5. In a round baler as set forth in claim 4 wherein
   said expandable bale forming chamber includes a pair of side walls, and
   said sensor means is mounted on at least one of said pair of said side walls.

6. In a round baler as set forth in claim 4 wherein
   said signal means includes a pair of signal devices,
   each of said devices being operable independently of the other to signal changes in compactness without regard to the other device.

7. In a round baler having a bale forming chamber including a pair of sidewalls, a crop loading monitor comprising
   signal means,
   apparatus operably coupled with said signal means for indicating when the compactness of a bale forming in said bale forming chamber changes,
   said apparatus includes a pair of sensors for simultaneously independently measuring the compactness of said bale at first and second portions thereof,
   said pair of sensors mounted in opposition, each being associated with one of said side walls,
   each of said pair of sensors includes an element extending from said side walls into the path of the bale for engagement therewith as the bale is being formed, and means for mounting said element for movement toward said side wall under conditions where the compactness of said bale being formed increases in the vicinity of said element.

8. In a round baler as set forth in claim 7 wherein said element comprises a leaf spring.

9. In a round baler as set forth in claim 8 wherein each of said leaf springs comprises an upstream end and a downstream end relative to the direction of movement of said bale being formed in said bale forming chamber, and said means for mounting includes means for securing said upstream end to its associated sidewall.

10. In a round baler having a bale forming chamber including a pair of side walls, and means for feeding crop material into said chamber, a crop loading monitor comprising signal means, apparatus operably coupled with said signal means for indicating when the compactness of said crop material in said bale forming chamber reaches a predetermined acceptable level, said apparatus including sensor means for sensing changes in the compactness of said crop material in said crop forming chamber, said sensor means mounted on at least one of said pair of said side walls, said sensor means including an element extending from said side wall into the path of said crop material for engagement therewith as the bale is being formed in said bale forming chamber, and means for mounting said element for movement toward said side wall under conditions where the compactness of said crop material increases in the vicinity of said element.

11. In a round baler as set forth in claim 10 wherein said element comprises a leaf spring.

12. In a round baler as set forth in claim 11 wherein said leaf spring comprises an upstream end and a downstream end relative to the direction of movement of said crop material, and said means for mounting includes means for securing said upstream end to said sidewall.

* * * * *